(12) United States Patent
Stuart (10) Patent No.: US 7,089,974 B2
(45) Date of Patent: Aug. 15, 2006

(54) FLOAT OPERATED OVERFILL PROTECTION DEVICE

(75) Inventor: Graham Mansfield Stuart, Redhill (GB)

(73) Assignee: Risbridger Limited, Surrey (GB)

( * ) Notice: Subject to any disclaimer, the term of this patent is extended or adjusted under 35 U.S.C. 154(b) by 0 days.

(21) Appl. No.: 10/493,505

(22) PCT Filed: Oct. 22, 2002

(86) PCT No.: PCT/GB02/04746

§ 371 (c)(1),
(2), (4) Date: Sep. 20, 2004

(87) PCT Pub. No.: WO03/035539

PCT Pub. Date: May 1, 2003

(65) Prior Publication Data

US 2005/0022897 A1 Feb. 3, 2005

(30) Foreign Application Priority Data

Oct. 22, 2001 (GB) ................................. 0125324.4

(51) Int. Cl.
*B65B 1/30* (2006.01)
(52) U.S. Cl. .................... 141/198; 141/212; 141/213; 141/95; 137/434; 137/446; 137/432

(58) Field of Classification Search ............... 141/198, 141/212, 213, 95; 137/432, 447, 448, 434, 137/429, 413, 446, 554; 251/77, 308, 263
See application file for complete search history.

(56) References Cited

U.S. PATENT DOCUMENTS

| 2,299,360 | A | * | 10/1942 | Tharp | 137/448 |
|---|---|---|---|---|---|
| 4,998,571 | A | * | 3/1991 | Blue et al. | 141/198 |
| 5,010,915 | A | * | 4/1991 | Johnson et al. | 141/198 |
| 5,095,937 | A | * | 3/1992 | LeBlanc et al. | 141/198 |
| 5,485,866 | A | * | 1/1996 | Bowen | 141/198 |
| 5,522,415 | A | * | 6/1996 | Hopenfeld | 141/198 |

FOREIGN PATENT DOCUMENTS

FR 1275314 A * 11/1961

\* cited by examiner

*Primary Examiner*—Khoa D. Huynh
(74) *Attorney, Agent, or Firm*—Fay, Sharpe, Fagan, Minnich & McKee, LLP (57) ABSTRACT

A fuel storage tank includes an overfill protection device for shutting off the flow of fuel into the tank via a fuel fill tube when the contents of the tank reach an intended maximum fill level. The overfill protection device includes a butterfly valve located within the fuel fill tube and a float, slidably mounted outside the fuel fill tube and operatively linked to the butterfly valve. The float rotates the butterfly valve towards the closed position in response to an increasing fuel level in the tank.

15 Claims, 9 Drawing Sheets

Fig. 10 ary of shutting off the incoming flow of
FLOAT OPERATED OVERFILL PROTECTION DEVICE This invention relates to fuel storage tanks, especially below ground storage tanks, and in particular provides a system for automatically shutting off the incoming flow of fuel when the tank is substantially full, thus preventing overfilling and spillage of fuel.

Various designs have been proposed in which a float within the tank is used to actuate a fill valve in order to shut off fuel flow to prevent overfilling. Such valves are commonly constructed with a flap-like valve member in the fill tube. One such design of a so-called overfill protection device (OPD) is described in U.S. Pat. No. 5,564,465. In some countries, legislation requires that fuel tanks in petrol filling stations are fitted with automatic shut-off valves.

Underground tanks are typically filled by gravity feed delivery tanker trucks. Delivery flow rates vary over a wide range depending on the tanker compartment fuel level and delivery pipework size and length. In some cases, tanker pipework delivery is assisted by a pump system to reduce delivery time. In practice, this covers a flow range from approximately 200 to 2000 liters per minute. Existing OPD designs have shown reliability problems at both extremes of this flow range.

It is, therefore, an object of the invention to provide an overfill prevention system for a fuel tank which operates more reliably under a variety of delivery conditions.

According to one aspect of the present invention there is provided a fuel storage tank having an overfill protection device (OPD) for shutting off the flow of fuel into the tank via a fuel fill tube when the contents of the tank reach an intended maximum fill level, said OPD including a butterfly valve located within said fuel fill tube and a float slidably mounted outside the fuel fill tube and operatively linked to the butterfly valve so as to rotate it towards the closed position in response to an increasing fuel level in the tank.

The advantage of using a butterfly valve rather than a simple flap-like valve is that this is subjected to equal pressure on each side of the valve so that the closing and opening forces required are minimised, irrespective of flow rates. The operating linkage of the valve is preferably outside the fuel fill pipe (sometimes referred to as the "drop tube") through which fuel is supplied into the storage tank from, e.g. a replenishing road tanker.

The float is mounted for sliding movement on the outside of the fill pipe and is preferably formed as an annular collar, which is preferably mounted in an annular recess in the wall of the pipe. In a preferred arrangement, the butterfly is mounted on trunnion shafts which extend through sealed bearings in the wall of drop tube, and are connected by external cranked linkages to the float, so that movement of the float causes the shafts to rotate.

One embodiment of the invention will now be described by way of example only, with reference to the accompanying drawings in which.

Figure 10:
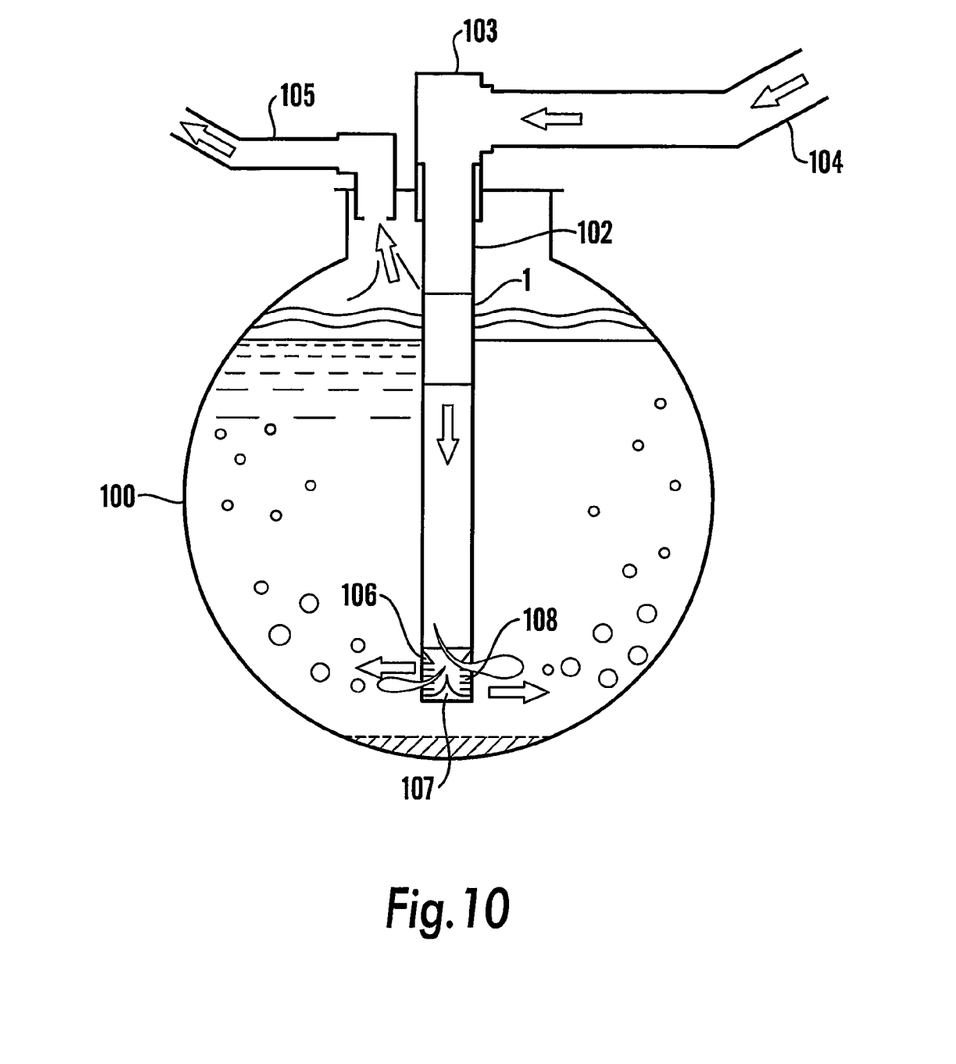
FIG. 10 is a diagrammatic cross-sectional view of a tank incorporating an OPD.

The general arrangement of the OPD in a typical installation is shown in FIG. 10.

A fuel tank 100 is fitted with a fuel fill pipe or drop tube 102 and a crane junction 103. Fuel is delivered from a road tanker via an inlet conduit 104 and passes down the pipe 102. Fuel is delivered from a road tanker (not shown) through a delivery hose and inlet line 104. Vapour generated on filling the tank is vented via a vent line 105. In the arrangement shown in FIG. 3, the end of the fill pipe is fitted with a diffuser 106 comprising a series of horizontal slots 108. The OPD section 1 is fitted in the fill pipe by joining the section to upper and lower sections 110 and 113 forming the remainder of the fill pipe.

Figure 1:
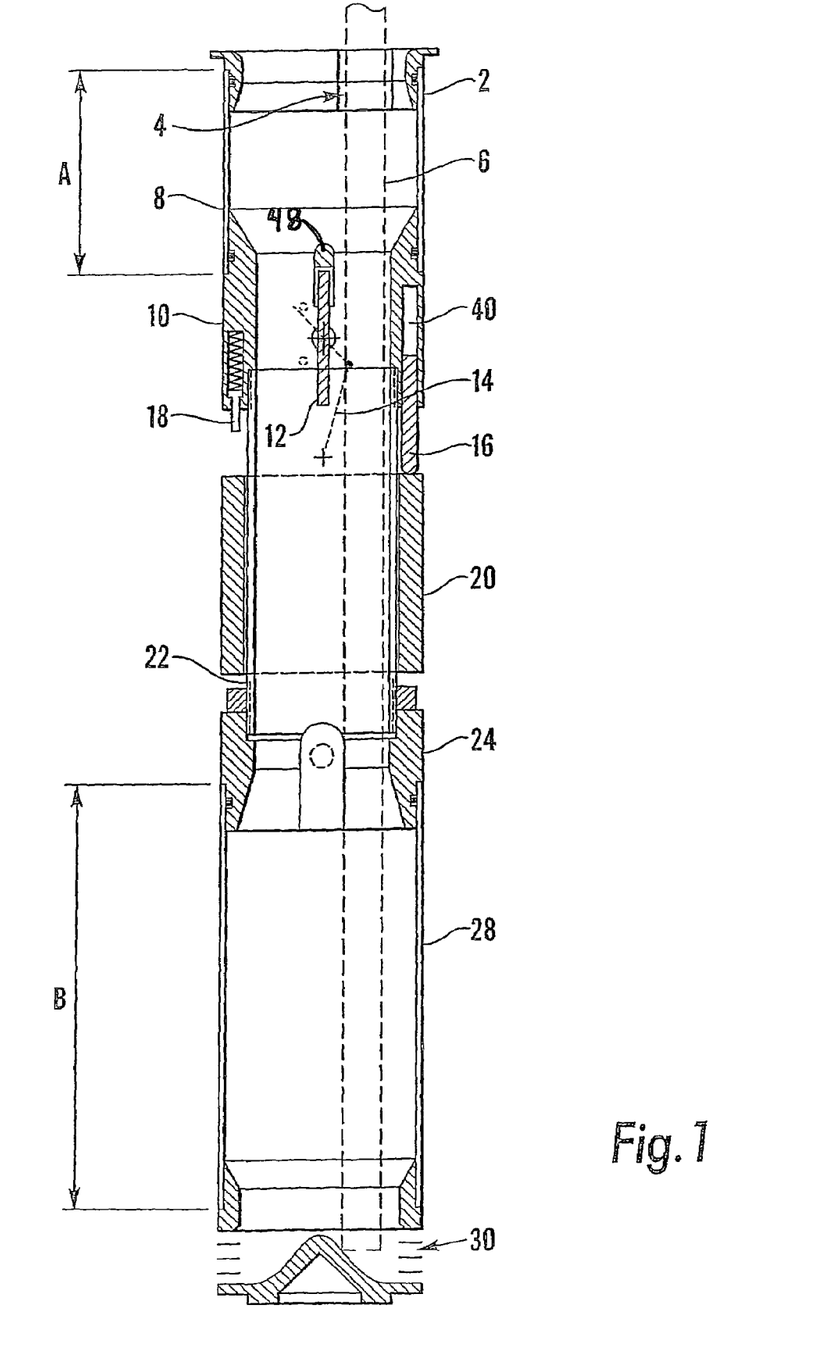
FIG. 1 is an axial cross-section through a fuel fill pipe incorporating an OPD.

Referring to FIG. 1, which shows the drop tube 102 in more detail, the upper end of the drop tube comprises an entry flange 2 incorporating a dip rod guide 4, the purpose of which is to control the position at which a dip rod 6, shown in dashed lines, can be inserted into the tank without interfering with the OPD mechanism. An upper section 8 of the drop tube connects the entry flange 2 to the upper section of a valve assembly 10, and the connections may be made in various ways, such as by screw threads or bolts, but in any case are preferably sealed with O rings. The axial length 'A' of the upper drop tube 8 will be varied so as to position the float of the valve assembly at the correct shut-off level in the tank, as explained in more detail below.

The valve assembly 10 contains a butterfly valve 12, actuating linkage 14, damper plunger 16 and resistor plunger 18. The actuating linkage 14 connects the butterfly valve 12 to a hollow cylindrical float 20 of closed cell foam or similar material, which forms a slidable collar on a centre valve body section 22, so that, as the float body rises, the linkage 14 will cause the butterfly 12 to rotate in an anti-clockwise direction.

The lower end of the centre valve body 22 is connected to the upper end of a lower valve body 24 which houses an air transfer valve (26, FIG. 2) which may, for example, be of the kind described in British patent no. 2,324,522. This valve is adapted to facilitate a smooth flow of fuel into the tank, by venting the air from inside the drop tube in a known fashion.

The lower end of the lower valve body 24 is also suitably jointed to the upper end of a lower drop tube 28 whose lower end carries a diffuser assembly 30, for example of the kind described in WO 9851610 to provide horizontal lamina flow discharge of the fuel into the tank. The length 'B' of the lower drop tube will be suitably arranged to match the tank dimensions, in such a way that the diffuser assembly is in close proximity to the tank floor.

Figure 2:
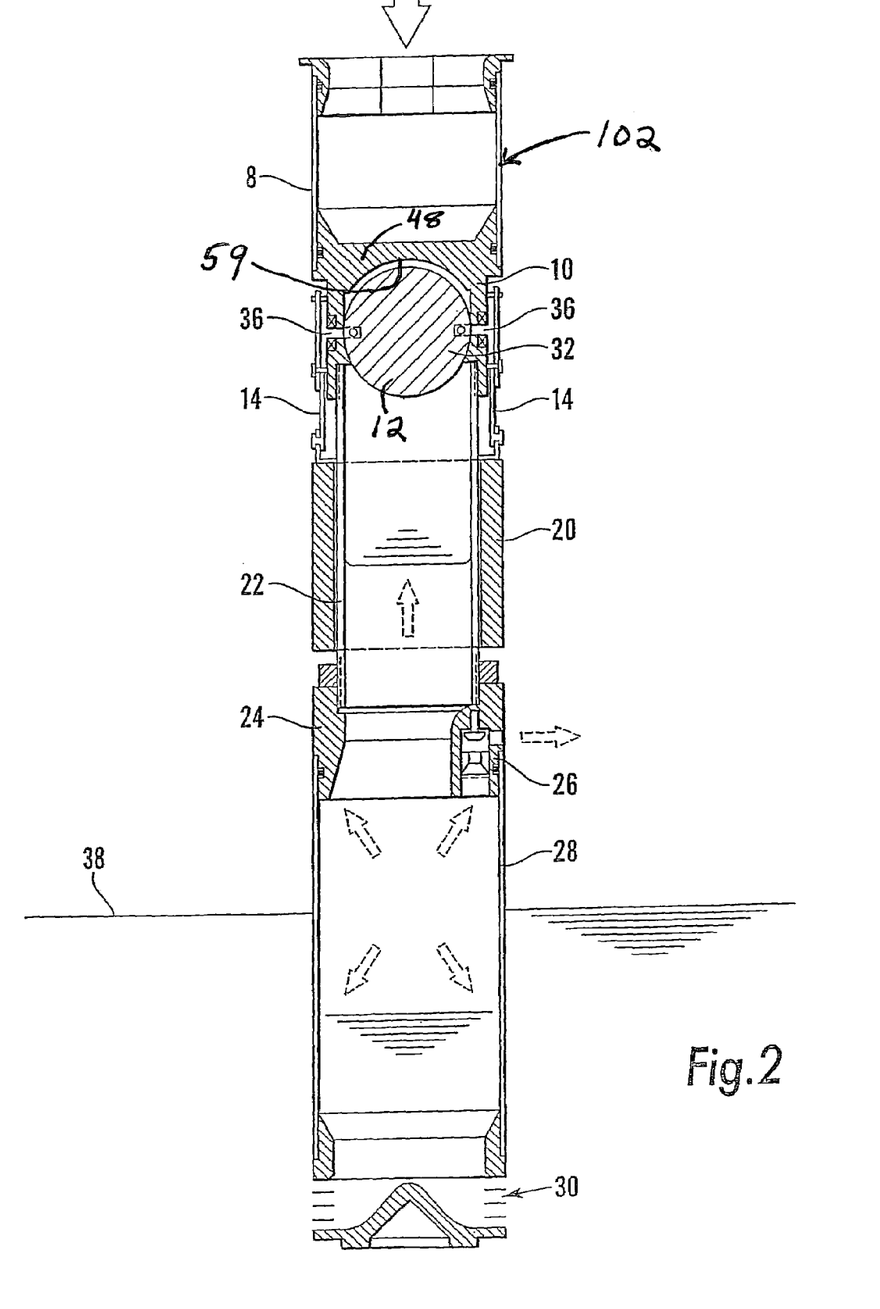
FIG. 2 is an axial cross-section taken at 90° from the view of FIG. 1.
Figure 5:
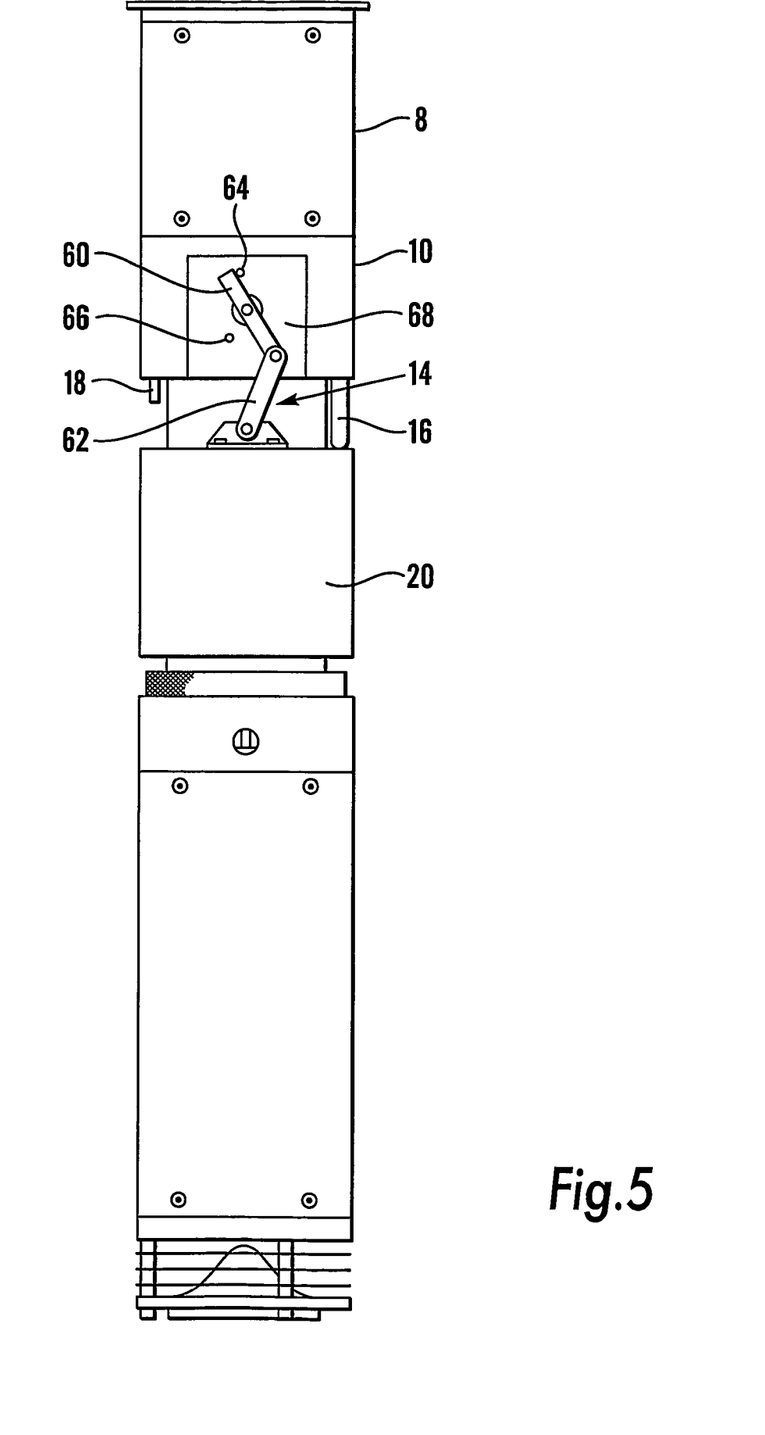
FIG. 5 is a side elevation of the fill pipe body, showing the float linkage.

As shown in more detail in FIGS. 2 and 5, the disc shaped vane 32 of the butterfly valve is mounted in the upper valve body on trunnion shafts 34 set in sealed bearings 36 and the outer ends of the shafts are connected to the linkages 14, for actuation by the float 20. As shown in the side elevation of FIG. 5, a crank arm 60 is fixed to the outer end of each trunnion shaft, and one end of the crank arm is connected by a pivoted link 62 to the upper end of the float 20. A pair of stop pins 64, 66 are arranged to limit the range of movement of the butterfly between the required closed and open positions.

In order to keep the profile of the assembly within the outer diameter of the drop tube, the crank arm 60 and link 62 are made as thin as possible, and a flat 68 is formed on each side of the valve body 10 in order to accommodate them.

Figure 3:
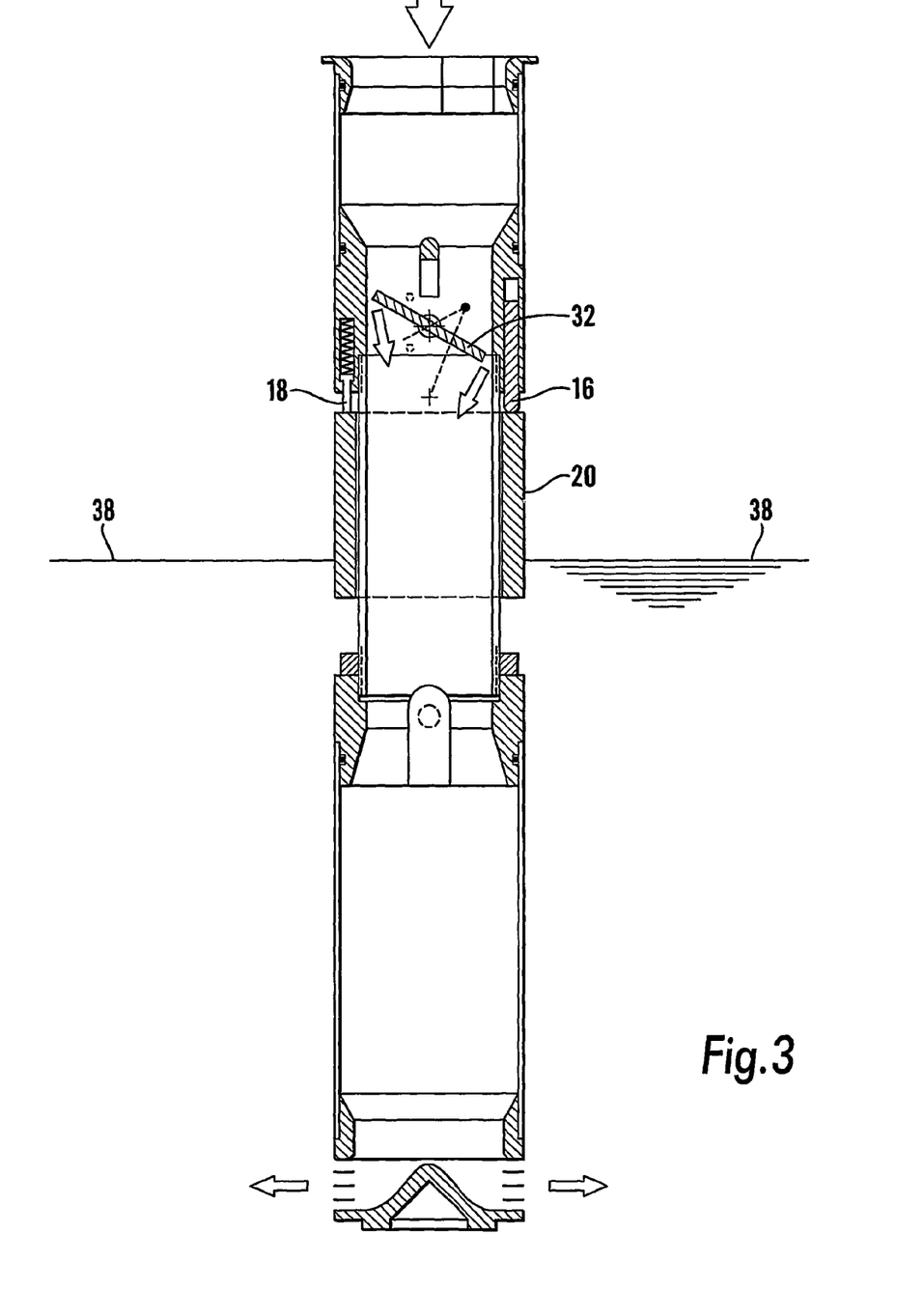
FIG. 3 is an axial cross-section corresponding to the view of FIG. 1, but showing the valve in a partially closed position.
Figure 4:
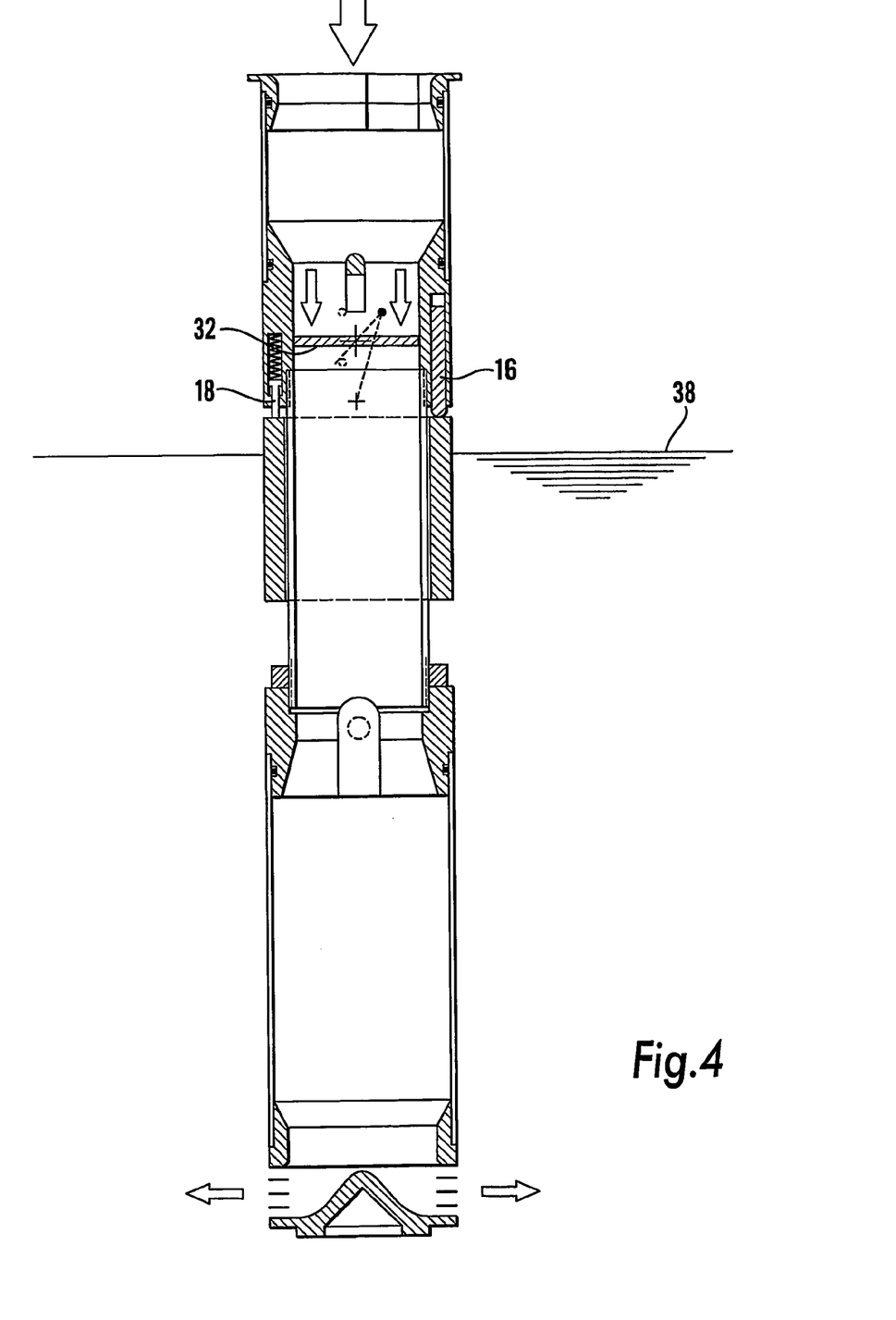
FIG. 4 is a view corresponding to the view of FIG. 1 but with the valve in a fully closed position.

Thus, in operation, as the fluid level 38 in the tank rises, lifting the float 20, as illustrated in FIG. 3, the vane 32 will be rotated in an anti-clockwise direction, from the position shown in FIGS. 1 and 2, until it reaches the level indicated in FIG. 4 at which the butterfly will be completely closed.

The damper plunger 16, which is mounted in a blind hole 40 in the lower surface of the upper valve body 10, is so arranged that it limits the speed of movement of the butterfly, and corresponding shock loads which tend to develop when the butterfly valve snaps closed, at high flow rates. In addition, the resistor plunger 18 comprises a spring or dead weight loaded piston, at a preset take-up position, which limits the free movement of the float, and consequently the linkage and butterfly valve rotation, until the buoyancy force of the float is sufficient to overcome the resistance of the plunger. In practice, this allows the butterfly valve to close approximately 90% at a tank fluid level of 95%, and holds this reduced flow rate until a fluid level of 97% is achieved. In this way, the operator is provided with a warning that full shut-off, and consequently an overfill condition, is about to be reached.

Figure 6:
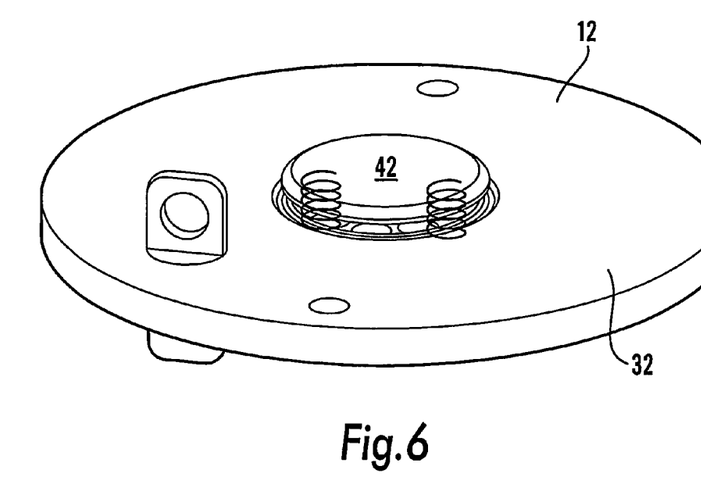
FIG. 6 is an enlarged perspective view of a butterfly valve member including a fast drain-down valve.
Figure 7:
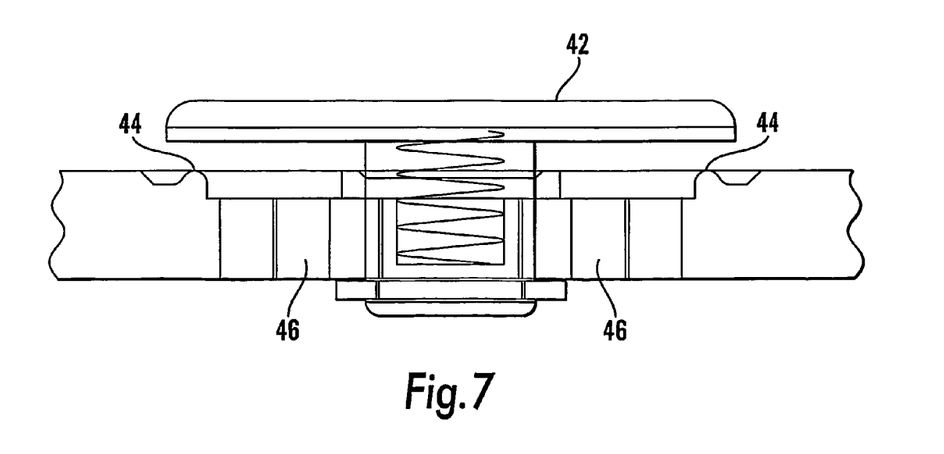
FIG. 7 is an enlarged side elevation, partly in section, of the valve member of FIG. 6.

In case an overfill condition is reached, the disc shaped vane 32 of the butterfly valve, as shown in the enlarged perspective view of FIG. 6, may be provided with a central poppet valve assembly 42 which acts as a drain down valve. As shown in the enlarged view of FIG. 7, the valve poppet is mounted so that the pressure of the incoming flow above a preset level, on the upper side, closes the poppet on its seat 44, but when the delivery tanker head pressure is removed, the poppet rises, opening the ports 46 so that fluid above the butterfly can be discharged into the tank.

Figure 8:
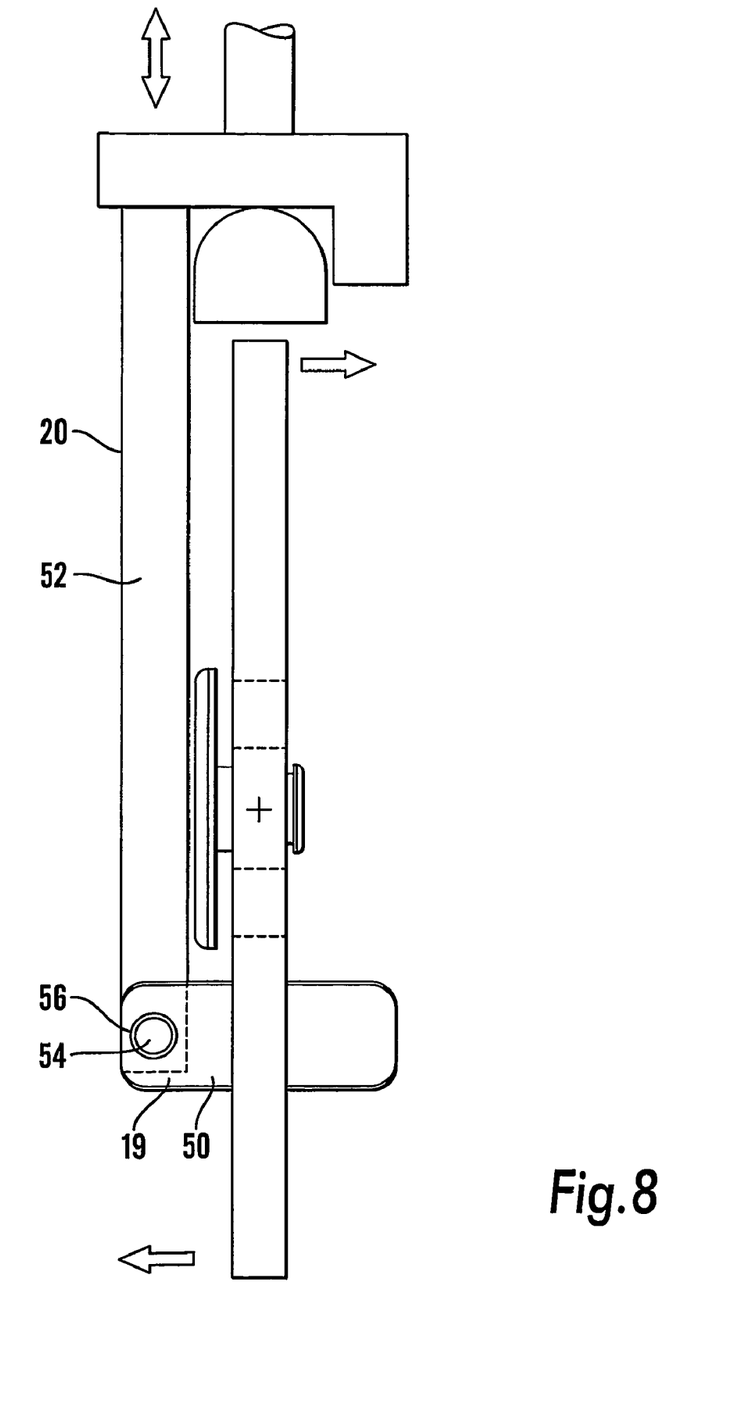
FIG. 8 is an enlarged view of the valve member in its mounted condition in the assembly.
Figure 9:
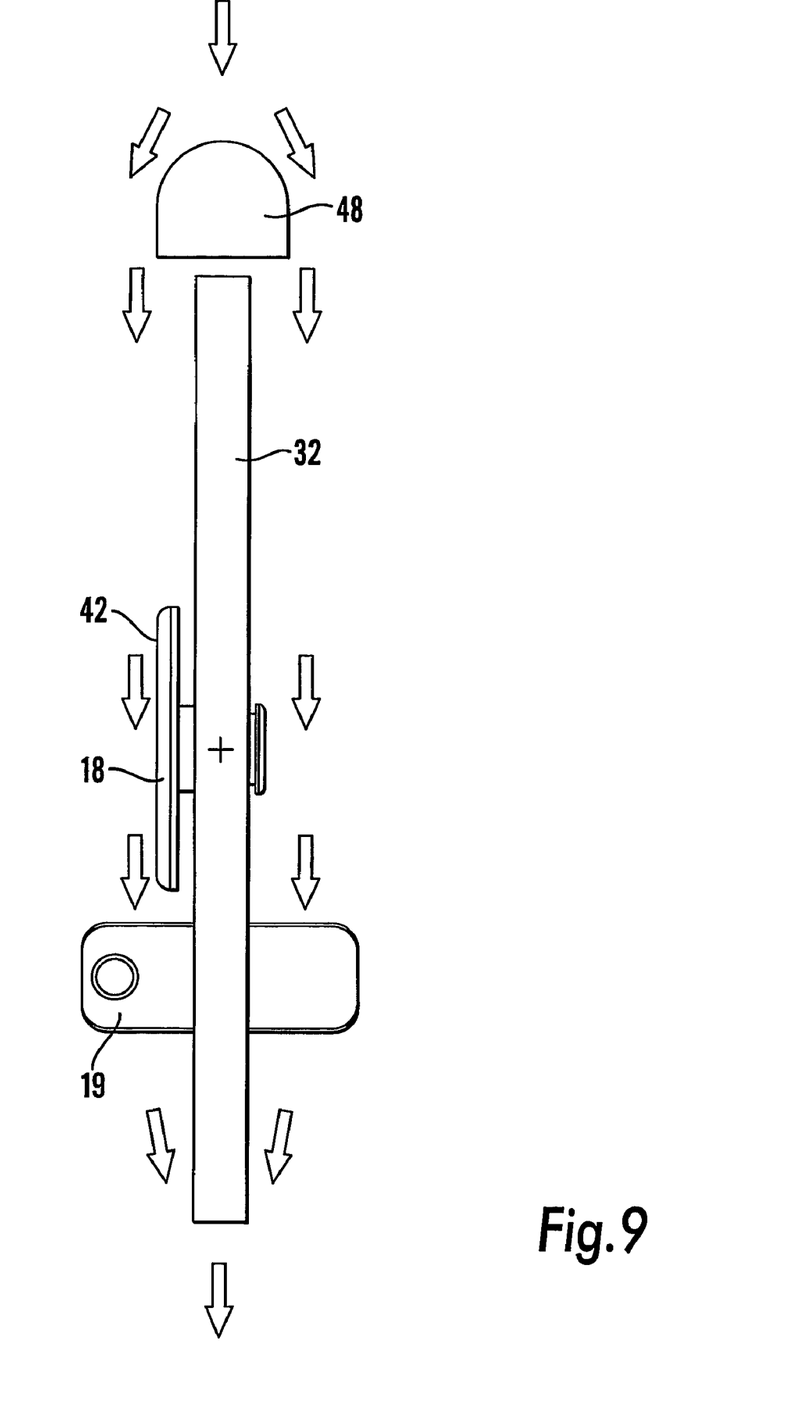
FIG. 9 is a view corresponding to that of FIG. 8, showing fluid flow patterns.

FIG. 9, which shows the vane 32 of the butterfly in the fully open position, also shows how the poppet valve 42 is made with a particularly thin section so that flow of fluid impinging on the open valve does not induce a twisting torque bias load. A deflector bar 48, mounted above the vane position, also acts to shield the valve. With reference again to FIG. 2, in one embodiment, the deflector bar 48 extends between opposed walls of the fuel fill tube or the drop tube 102. The deflector bar includes a radiused lower face 59 to accommodate the shape of the vane 32 of the butterfly valve. With reference once more to FIG. 1, it can be seen that the deflector bar 48 in one embodiment is located in a plane aligned with the plane of the butterfly valve 12. FIGS. 8 and 9 also illustrate the arrangement of a pick-up bracket 50, positioned on one side of the butterfly, so as to avoid interference from the dip rod, which allows a test tool 52 to be inserted from the fill point so as to engage a pin 54 carried on its end into a corresponding aperture 56 on the pick-up bracket. In this way, the test tool 52 can be lifted, so as to test the butterfly movement, and is carried in a sleeve which is spring loaded and can be calibrated to provide a measurement of the force required to open the butterfly.

The invention claimed is:

1. A fuel storage tank having an overfill protection device (OPD) for shutting off the flow of fuel into the tank via a fuel fill tube when the contents of the tank reach an intended maximum fill level, the OPD including a butterfly valve located within the fuel fill tube and a float, slidably mounted on the outside wall of the fuel fill tube and operatively linked to the butterfly valve so as to rotate it towards the closed position in response to an increasing fuel level in the tank, the float being linked to the butterfly valve by means of an external crank mechanism connected between the float and a pair of trunnion shafts of the butterfly valve so that linear movement of the float is converted to rotary movement of the butterfly valve, wherein a range of movement of the float is limited by a resistor plunger which exerts a preset resistance against the movement of the float as the butterfly valve approaches the closed position, until the buoyancy of the float is sufficient to overcome the resistance, so that the operator is warned that the full shut-off position is approaching.

2. A fuel storage tank according to claim 1 in which the float comprises an annular collar which is slidably mounted on the external wall of the tube, the trunnion shafts of the butterfly valve extending through sealed bearings in the wall of the tube and being connected to the crank arms of the mechanism.

3. A fuel storage tank according to claim 1 in which the speed of movement of the float is limited by means of at least one damper plunger slidable in an axially extending housing on the outside of the tube.

4. A fuel storage tank according to claim 1 in which the vane of the butterfly valve further comprises a poppet valve assembly which is arranged to be urged to the closed position, while the tank is being filled, by the pressure of the incoming flow, but opens when the tanker head pressure is removed, so that residual fluid above the butterfly valve can be drained into the tank after the butterfly valve has closed.

5. An overfill protection device (OPD) for a fuel storage tank, comprising:

a valve located within a fuel fill tube of the fuel storage tank;

a float slidably mounted on the outside wall of the fuel fill tube and operatively linked to the valve so as to move the valve from an open position toward a closed position in response to an increasing fuel level in the tank; a resistor plunger operatively connected to the float for limiting a range of movement of the float.

a damper plunger slidably mounted in an axially extending housing located adjacent the fuel fill tube.

6. The OPD of claim 5 further comprising a crank mechanism for connecting the float to the valve.

7. The OPD of claim 5 wherein the float comprises a collar slidably mounted on an external wall of the fuel fill tube.

8. The OPD of claim 5 further comprising a poppet valve assembly operatively connected to said valve.

9. The OPO of claim 5 further comprising a deflector member mounted above the butterfly valve to shield the valve from the flow of incoming fluid.

10. A fuel storage tank having an overfill protection device (OPD) for shutting off the flow of fuel into the tank via a fuel fill tube when the contents of the tank reach an intended maximum fill level, the OPD including:

a butterfly valve located within the fuel fill tube;

a float, slidably mounted outside the fuel fill tube and operatively linked to the butterfly valve so as to rotate it towards the closed position in response to an increasing fuel level in the tank; and, a deflector member mounted above the butterfly valve to shield the valve from the flow of incoming fluid, the deflector extending between the opposed walls of the fuel fill tube so as to span across the opening between the opposed walls in a plane aligned with the plane of the butterfly valve and including a radiused lower face to accommodate the shape of the butterfly valve.

11. The OPO of claim 10 further comprising a crank mechanism for connecting the float to the valve.

12. The OPD of claim 10 wherein the float comprises a collar slidably mounted on an external wall of the fuel fill tube.

13. The OPO of claim 10 further comprising a damper plunger slidably mounted in an axially extending housing located adjacent the fuel fill tube.

14. The OPD of claim 10 further comprising a resistor plunger operatively connected to the float for limiting a range of movement of the float.

15. The OPD of claim 10 further comprising a poppet valve assembly operatively connected to said valve.

* * * * *